United States Patent
Morikawa

(10) Patent No.: US 8,038,172 B2
(45) Date of Patent: Oct. 18, 2011

(54) MOTORCYCLE

(75) Inventor: Hisashi Morikawa, Iwata (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 304 days.

(21) Appl. No.: 12/352,229

(22) Filed: Jan. 12, 2009

(65) Prior Publication Data
US 2009/0218155 A1    Sep. 3, 2009

(30) Foreign Application Priority Data
Feb. 29, 2008    (JP) .................. 2008-049557

(51) Int. Cl.
*F02M 37/04*    (2006.01)

(52) U.S. Cl. .......... 280/833; 280/835; 123/509

(58) Field of Classification Search .......... 180/219; 280/833, 835; 123/509
See application file for complete search history.

(56) References Cited

U.S. PATENT DOCUMENTS

| | | | |
|---|---|---|---|
| 4,492,250 A * | 1/1985 | Ohmori et al. | 137/590 |
| 6,907,865 B1 * | 6/2005 | Hanby | 123/509 |
| 7,275,523 B2 * | 10/2007 | Kimura et al. | 123/509 |
| 7,533,904 B2 * | 5/2009 | Koike et al. | 280/834 |
| 7,631,885 B2 * | 12/2009 | Safarik et al. | 280/293 |
| 7,717,466 B2 * | 5/2010 | Asamura et al. | 280/835 |
| 2005/0126546 A1 * | 6/2005 | Yagisawa | 123/509 |
| 2008/0314670 A1 * | 12/2008 | Buell et al. | 180/219 |

FOREIGN PATENT DOCUMENTS

JP    2004-027937    1/2004

\* cited by examiner

*Primary Examiner* — Kevin Hurley
(74) *Attorney, Agent, or Firm* — Keating & Bennett, LLP

(57) ABSTRACT

To provide a compact fuel tank including a fuel pump in accordance with one or more embodiments. For example in an embodiment, a motorcycle includes a tank rail forming an upper part of a body frame, a fuel tank having a pair of tank sections disposed across the tank rail in a vehicle width direction and mounted on and across the tank rail, and a fuel pump disposed in the fuel tank for supplying fuel to an engine, in which a mounting surface for the fuel pump is formed on a bottom of one of the pair of tank sections and the mounting surface is formed to be tilted in an in-and-out direction with respect to the vehicle width direction.

19 Claims, 5 Drawing Sheets

MOTORCYCLE

CROSS-REFERENCE TO RELATED APPLICATIONS

This application is related to and claims priority to Japanese Patent Application No. 2008-049557, filed on Feb. 29, 2008, the entire contents of which is incorporated herein by reference in its entirety.

TECHNICAL FIELD

The present invention relates generally to a motorcycle.

BACKGROUND

In a conventional motorcycle provided with a fuel pump, the fuel pump may be positioned inside the fuel tank as it occupies an additional space. For example, Japanese Patent Application Publication No. 2004-027937 discloses a fuel tank with an opening provided on its bottom through which a fuel pump is inserted to be accommodated therein. The fuel pump is placed on a lid and the lid together with the fuel pump are assembled on the fuel tank around its opening and secured while sealing therebetween.

A fuel tank as described in the above example has a wide bottom. Accordingly, if a fuel pump is mounted on such a bottom, no problems generally would occur. However, there are some cases as conventionally known that a fuel tank is mounted across a tank rail disposed above a body frame. In this case, a tank section is formed to be divided into a left and a right part in a vehicle width direction across the tank rail. In such a case, each bottom of the individual fuel tank sections tends to be narrow, which makes it difficult to secure a sufficient width dimension for mounting the fuel pump. In the case that the width dimension is simply extended for mounting the fuel pump, the dimension of the whole fuel tank becomes too large in the vehicle width direction, which is not practicable.

SUMMARY

The present invention, in accordance with one or more embodiments, is directed, for example, to problems such as described in the above situation. For example for an embodiment, a mounting space is secured for a fuel pump in a fuel tank that is divided into a left and a right part without increasing the size of the tank.

In accordance with an embodiment, a motorcycle includes a tank rail forming an upper part of a body frame, a fuel tank having a pair of tank sections disposed across the tank rail in a vehicle width direction and a connecting section for fluidly connecting the pair of tank sections across the tank rail, and a fuel pump disposed in the fuel tank for supplying fuel to an engine, in which a mounting surface for the fuel pump is formed on a bottom of one of the pair of tank sections and the mounting surface is formed to be tilted with respect to the vehicle width direction.

In accordance with an embodiment, a mounting surface for a fuel pump is formed to be tilted with respect to a vehicle width direction. Therefore, the dimension in a vehicle width direction of the whole fuel tank may be reduced while securing the required width dimension for mounting the fuel pump.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

Figure 1:
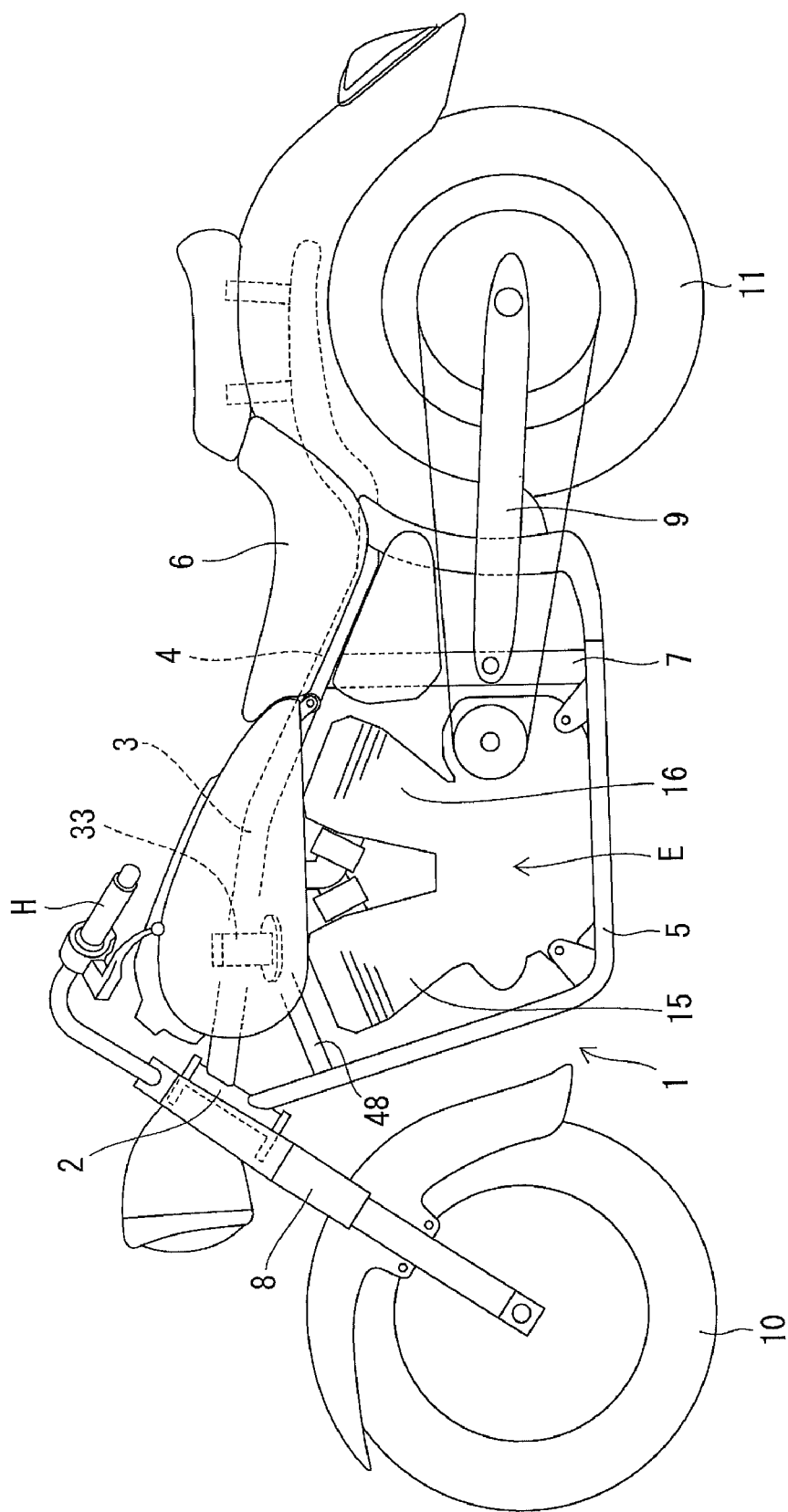
FIG. 1 illustrates a side view of a motorcycle in accordance with an embodiment of the present invention.

The description of various reference numerals and symbols in the drawings may be set forth in accordance with one or more embodiments, for example, as follows: 1: body frame, 3: tank rail, 13: side stand, 15 and 16: front and rear cylinder, 19: first tank section, 20: second tank section, 26: filler opening, 30: mounting face, 31: fuel pump unit, 32: second protrusion, 33: fuel pump, 34: release pipe (pipe), 35: return pipe (pipe), 38: mounting hole, 40: sealing face, 43: base plate, 44: sealing member, 47: suction port, E: engine, and T: fuel tank.

Embodiments of the present invention and their advantages are best understood by referring to the detailed description that follows. It should be appreciated that like reference numerals are used to identify like elements illustrated in one or more of the figures.

DETAILED DESCRIPTION

A description is made of one or more embodiments of the invention with reference to FIG. 1 to FIG. 5. Note that the term "left" and "right" hereinafter is defined as seen from the rider.

A motorcycle disclosed in one or more embodiments may be referred to as an "American type" with a multi-cylinder engine E having two cylinders 15, 16 arranged in a V shape. For example in an embodiment, in reference to both of the cylinders 15, 16, the front side cylinder 15 is disposed relatively right with respect to the rear side cylinder 16 and is deviated to the side opposite to a side in which a fuel pump unit, which will be described later, is placed. An air cleaner 59 is positioned on the right side of the vehicle within the angular range of a V-bank of the engine E. Air from the air cleaner is adjusted by a throttle valve 61 provided in a throttle body 60, is mixed with fuel injected by a fuel injection valve 63 when it passes through an intake pipe 62, and is supplied to each cylinder.

A body frame 1 includes: a head pipe 2; a tank rail 3 extending slightly obliquely downward to the rear of the vehicle from the head pipe 2; seat rails 4 respectively bifurcating from the tank rail 3 in the vehicle width direction at its rear end and extending rearward for supporting a seat 6; down tubes 5 respectively bifurcating from the head pipe 2 in the vehicle width direction, extending obliquely downward rearward, and further extending horizontally; and swing arm brackets 7 vertically connecting the down tubes 5 and the seat rails 4 positioned above. In a connection part between the head pipe 2 and both of the down tubes 5, a plate (not shown) is provided to connect them together. A reinforcing frame 48 is provided to connect the plate and the tank rail 3.

A pair of front forks 8 is swingably supported by the head pipe 2. A front wheel 10 is supported by the front fork 8 at its lower end. A front edge of a swing arm 9 is connected to a swing arm bracket 7. A rear wheel 11 is supported by the swing arm 9 at its rear end.

Figure 2:
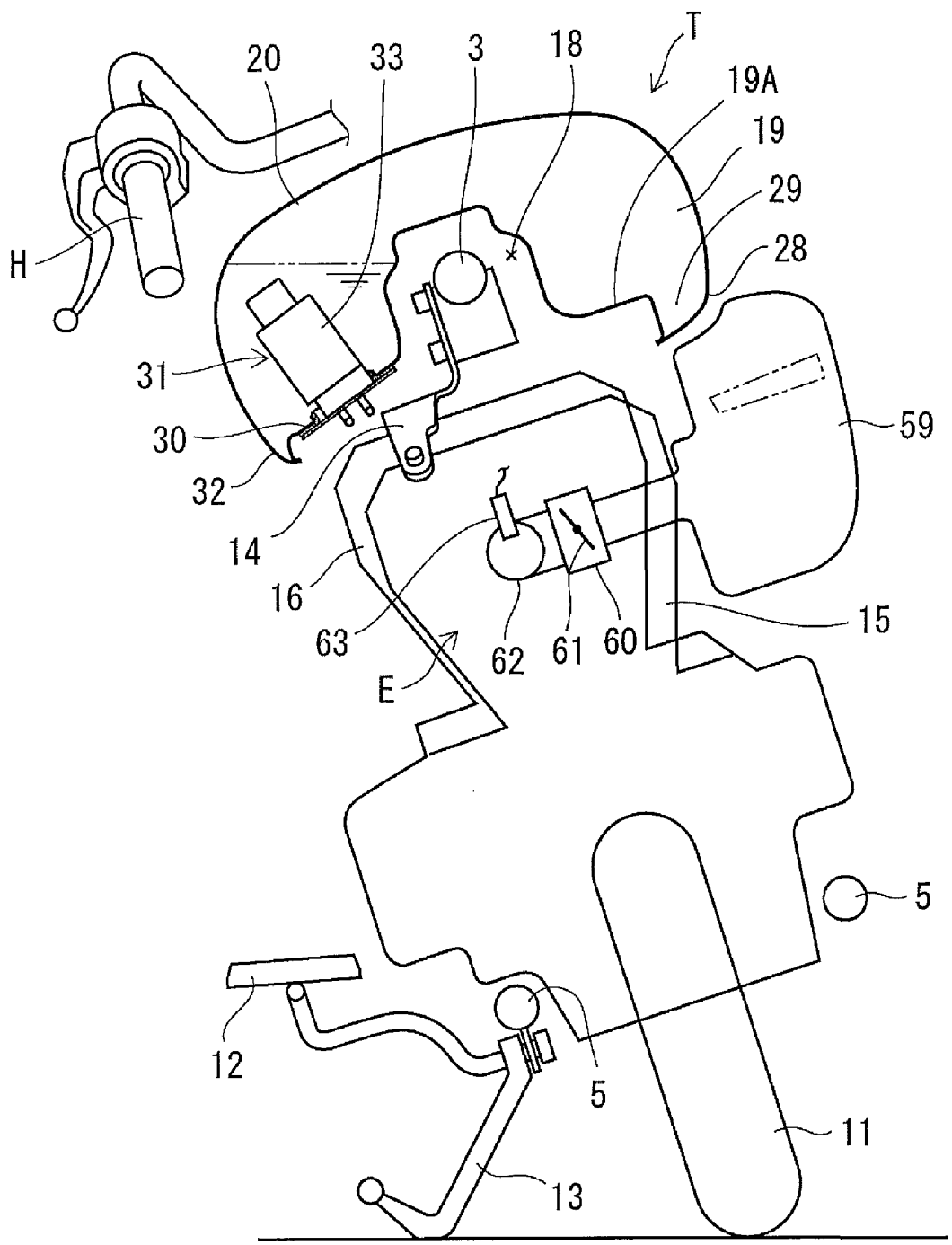
FIG. 2 illustrates a schematic view of the motorcycle of FIG. 1 as viewed from the rear in accordance with an embodiment of the present invention.
Figure 3:
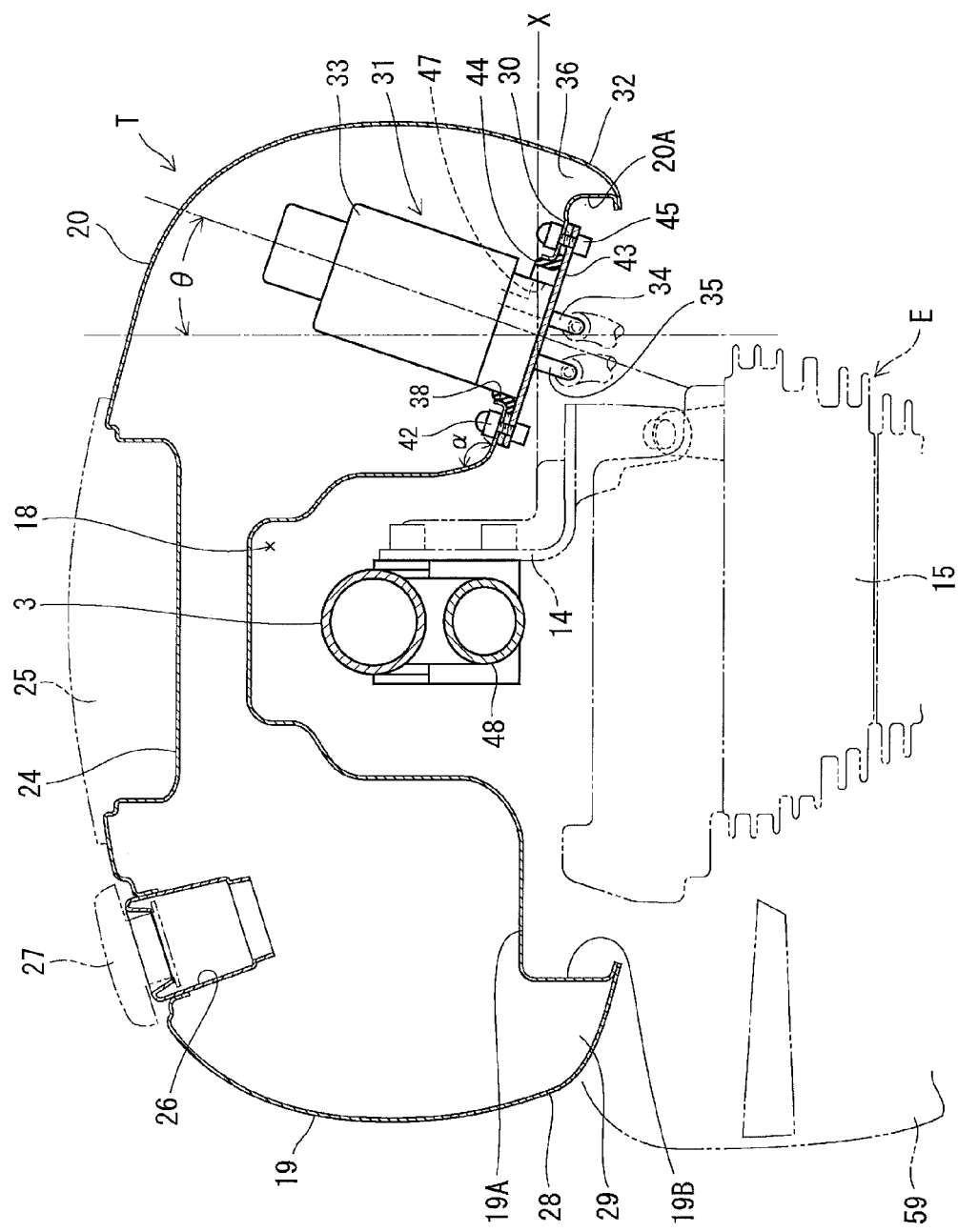
FIG. 3 illustrates a front sectional view of a fuel tank in accordance with an embodiment of the present invention.

As shown in FIG. 2, down tubes 5 extend generally horizontally. A footrest 12 and a side stand 13 are attached to the left down tube of the down tubes 5 on the portion extending generally horizontally. The engine is arranged in a space surrounded by the tank rail 3, the down tubes 5, and the swing arm bracket 7 as viewed from a side. Lower support to the engine E is made by the down tubes 5. On the other hand, upper support to the engine E is made by an engine lifting lug 14 attached to the left side of the tank rail 3, which is located in the center in a fore-and-aft direction of the vehicle. A lower end of the engine lifting lug 14 is divided in the fore-and-aft direction of the vehicle. Each divided end is respectively connected to upper end surfaces of the cylinders 15, 16.

A fuel tank T is mounted on the tank rail 3. The whole figure of the fuel tank T is shown specifically in FIGS. 4 and 5 in accordance with one or more embodiments. An exterior contour of the fuel tank in the side view shown in FIG. 4 rises up so that a front part thereof swells, and forms a peak 17 at a location further forward than the middle of the fuel tank. It then extends generally straight in a slight down grade toward the rear end and finally turns forward at its rear end. The exterior contour in the bottom view shown in FIG. 5 extends most outward at a location which corresponds to the peak 17 described above in the fore-and-aft direction of the vehicle. From the most extended position toward the front end, the exterior contour narrows at a relatively large angle of bend. On the other hand, from the most extended position toward the rear end, it gradually narrows and its rear end edge is finally formed to be straight in the vehicle width direction.

Figure 4:
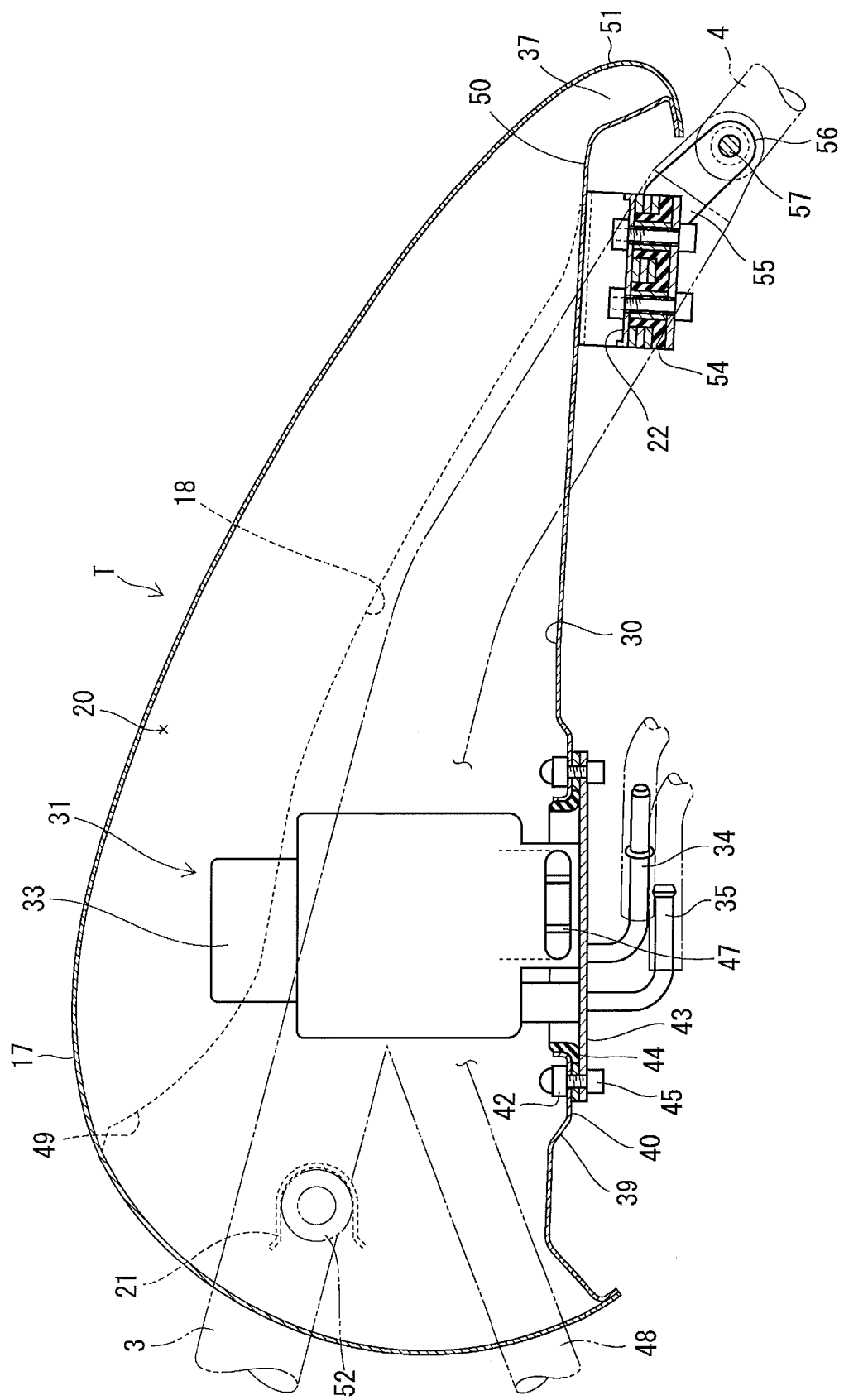
FIG. 4 illustrates a side sectional view of the fuel tank in accordance with an embodiment of the present invention.
Figure 5:
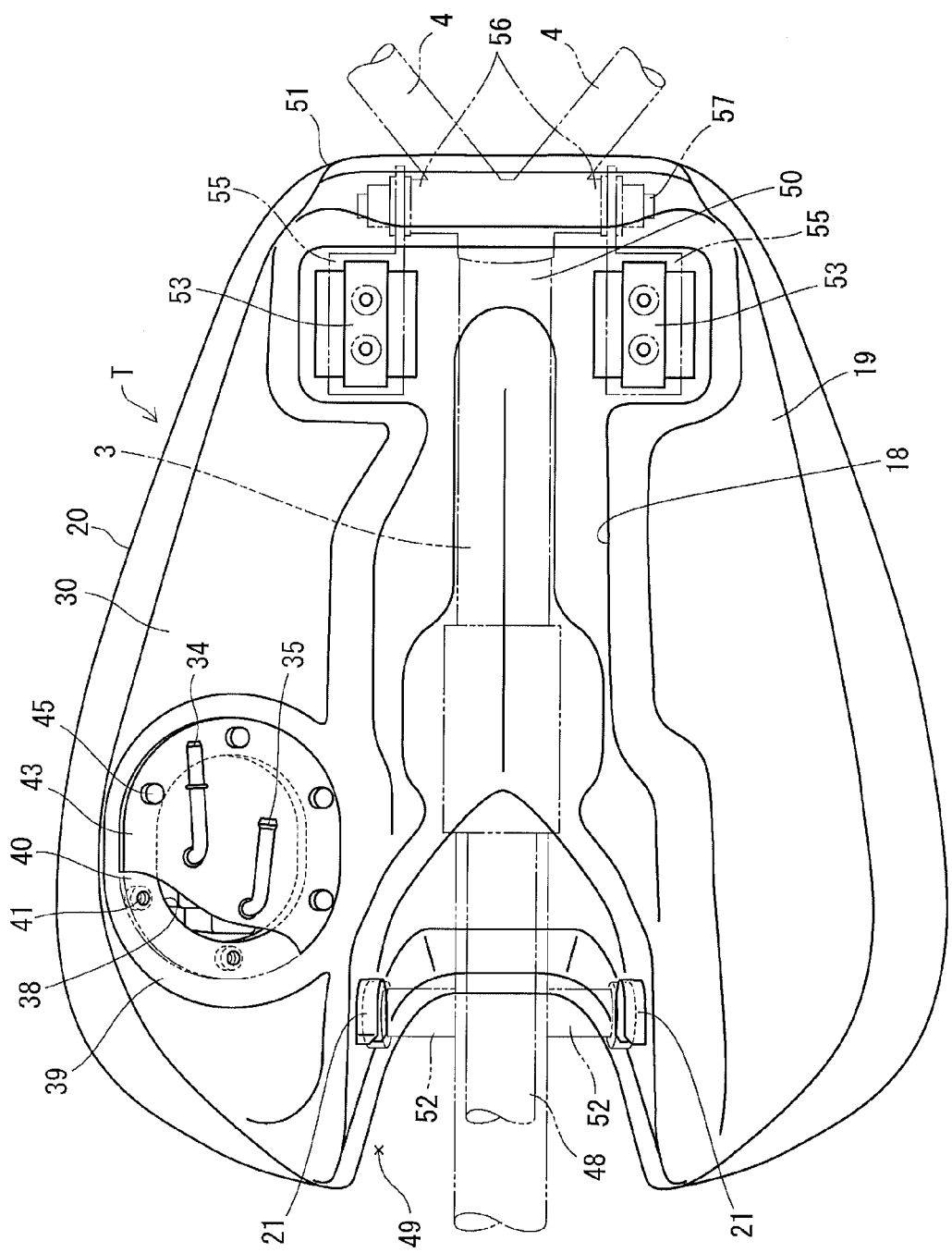
FIG. 5 illustrates a bottom view of the fuel tank in accordance with an embodiment of the present invention.

As shown in FIGS. 4 and 5, the central portion of the fuel tank T in the vehicle width direction is largely hollowed rearward from the front of the peak 17 through a full range of heights, which forms a clearance recess 49 to prevent the fuel tank to interfere with the front end of the tank rail 3 and the rear end of the reinforcing frame 48. In the rear side of the bottom of the fuel tank T, a clearance groove 18 is concavely formed along the center line of the vehicle width direction continuously from the clearance recess 49.

The fuel tank T is branched left and right across the above clearance recess 49 and the clearance groove 18, which respectively forms a first and a second tank sections 19, 20. The clearance groove 18 is adapted to be passed through by the tank rail 3. As shown in FIG. 4, a ceiling face of the clearance groove 18 is formed along the extending direction of the tank rail 3. In other words, the depth (height) of the clearance groove 18 becomes shallow (low) toward the rear. The rear end of the clearance groove 18 is positioned slightly before the rear end of the bottom of the fuel tank T, thereby forming a connecting section 50 between the first and the second tank sections 19, 20. Bottom faces of the first and the second tank sections 19, 20 are generally flush with the connecting section 50. A rear part of the connecting section 50 communicates with an inner space of a rear protrusion 51 which fluidly connects a first and a second protrusions 28, 32 (a first and a second groove sections 29, 36) of the first and the second tank sections 19, 20.

Assembly structure of the fuel tank T with the tank rail 3 is as follows in accordance with one or more embodiments. The fuel tank T straddles the tank rail 3 received in the clearance groove 18 from above. In this state, the first tank section 19 is positioned in the right side and the second tank section 20 is positioned in the left side. A pair of front side receivers 21 are symmetrically attached to facing walls in the vehicle width direction which construct the clearance recess 49 on the fuel tank T. Both of the front receivers 21 laterally form the U letter shape opening forward and are fitted from the rear into a pair of protruding shafts 52 provided on the tank rail 3 to protrude outward in the vehicle width direction. With the above construction, the fuel tank T is supported at the front side. On the other hand, a pair of attaching seats 22, which protrude downwards, are provided at locations sandwiching the connecting section 50 and the rear part of the clearance groove 18 in the vehicle width direction on the bottoms of both of the tank sections 19, 20. Tank brackets 55 are respectively attached to both of the attaching seats 22 via rubber bushings 54 and the like.

A pair of cylindrical bosses 56 are provided to respectively protrude outward in the vehicle width direction in the proximity of a joint between the seat rails 4 and the tank rail 3. The bosses 56 are clamped between the rear ends of the tank brackets 55, all of which are penetrated and fastened by a joint bolt 57 via a collar with a nut. With this construction, the rear side of the fuel tank T is fixed.

A mounting recess 24 is formed on a front-end upper surface of the fuel tank T around the center in the vehicle width direction, where a speedometer 25 may be embedded. A filler opening 26 is provided on an upper surface of the first tank section 19, which is closed by an open/close cap 27. A bottom surface 19A of the first tank section 19 is formed to be flat and horizontal (to be horizontal when the whole vehicle is in an erect posture) throughout the vehicle length. The first protrusion 28 protrudes downward to form an outer lower edge of the first tank section 19 generally throughout the vehicle length. The height of the lower edge of the first protrusion 28 (not shown) is formed almost even (horizontal) throughout the vehicle length.

The first groove section 29, which communicates with the first tank section 19, is formed along the fore-and-aft direction of the vehicle inside the first protrusion 28. Though an outer surface of the first protrusion 28 is formed to be curved continuously from the upper side wall, an inner surface thereof is bent at a generally right angle with the bottom of the first tank section 19 to form a vertical wall 19B.

A bottom surface of the second tank section 20 is flat generally throughout the vehicle length and forms a mounting face 30 (or mounting surface) on which a fuel pump unit 31 is mounted. Almost the whole area of the mounting face 30 is formed in a down grade (tilt angle $\theta$ shown in FIG. 3) from the inner edge side to the outer edge side. The central height (height marked by X in FIG. 3) of the mounting face 30 in the vehicle width direction is adapted to be positioned at generally the same as the height of the bottom surface 19A of the first tank section 19 when the whole vehicle is in an erect posture.

Along an outer edge of the mounting face 30 in the vehicle width direction, the second protrusion 32 is formed to protrude downward generally throughout the vehicle length. The height of the lower edge thereof is adapted to be generally same as the height of the lower edge of the first protrusion 28 and generally even (horizontal) throughout the vehicle length. Specifically, the height by which the second protrusion 32 protrudes downward from the outer edge of the mounting face 30 is adapted to be set to the extent that pipes 34, 35 connecting to a fuel pump 33, which will be described later, are not seen from a side of the vehicle.

Though an outer surface of the second protrusion 32 is formed to be curved continuously from the upper side wall, an inner surface thereof is formed continuously from the outer edge of the mounting face 30 to form a vertical face 20A when the whole vehicle is in an erect posture. The second groove section 36, which communicates with the second tank section 20, is formed along the fore-and-aft direction of the vehicle inside the second protrusion 32. As described above, the second groove section 36 and the first groove section 29 are fluidly connected to each other via a communication groove 37 formed inside the rear protrusion 51 (see FIG. 4).

As described above, the fuel tank T is formed to be expanded forward. Therefore, the dimension of the mounting face 30 in the vehicle width direction is gradually enlarged toward the front. A mounting opening 38 is provided on the mounting face 30 at a location near its front end (in particular, a space between the location where the engine lifting lug 14 is provided and the location where the front receiver 21 is provided) through which the fuel pump unit 31 is incorporated. The mounting opening 38 has an elliptic shape with its longer side in the fore-and-aft direction of the vehicle in accordance with one or more embodiments. A mounting section 39 is swelled out around the whole mounting opening 38 by pressing downward. The mounting section 39 is formed generally uniformly on the mounting face 30. A sealing face 40 is formed flat with a generally constant width around the mounting opening 38 by press forging. A plurality of perforated mounting holes 41 are formed in the sealing face 40 at regular intervals of angles. Nuts 42 are welded on the bottom surface of the second tank section 20 so as to fit to the respective mounting holes 41.

The fuel pump unit 31 includes a base plate 43 and the fuel pump 33 mounted on an upper surface of the base plate 43 in a standing posture. The base plate 43 is formed flat to tightly contact with the whole sealing face 40 and is formed to be of the size to close the mounting opening 38.

When the fuel pump unit 31 is mounted on the second tank section 20, an annular sealing member 44 is interposed between the base plate 43 and the sealing face 40 and a setscrew 45 inserted into each of the mounting holes 41 is screwed into the nut 42. Because the mounting face 30 is tilted, the fuel pump 33 is also held tilted outward in the vehicle width direction. Location in the fore-and-aft direction of the vehicle in which the fuel pump 33 is mounted is, as shown in FIG. 4, set to generally correspond to the peak 17, the highest position of the fuel tank T.

A fuel suction port 47 is provided on a face at the lower end of the fuel pump 33, the face opposing to the second groove section 36. A height at which the suction port 47 is positioned is set generally the same as the height of the bottom surface of the first tank section 19. A release pipe 34 (pipe) connected to a releasing side of the fuel pump 33 protrudes downward from a lower surface of the base plate 43 and then bends rearward of the vehicle. A fuel pipe is connected to the release pipe 34 to supply fuel in the fuel tank T to a fuel injection valve at a predetermined pressure. Also, a return pipe 35 (pipe) is provided to protrude downward from the lower surface of the base plate 43 through which residual fuel from the engine E side returns to the fuel pump 33. Like the release pipe 34, the return pipe 35 as a whole may be formed generally in the shape of an L. Electrical wiring (omitted in the figures) to the fuel pump 33 is drawn out downward from the base plate 43 and connected to a drive control circuit (not shown) for the fuel pump 33, as would be understood by one skilled in the art.

Next, the operating effects of one or more embodiments that are configured as described above will be described. In an embodiment, the mounting face 30 for the fuel pump unit 31 in the second tank section 20 is formed tilted in the vehicle width direction. Therefore, in comparison with the case that the mounting face 30 is formed horizontal, the width dimension in the horizontal direction (vehicle width direction) of the mounting face 30 can be reduced, thereby reducing the width dimension of the second tank section 20 in the horizontal direction and that of the whole fuel tank T.

Incidentally, the fuel pump 33 is positioned in the second tank section 20 side provided with the side stand 13. Generally, the rider gets on and off the vehicle at the side stand 13 side. Therefore, if the vehicle itself tilts to contact with the ground, parts such as the footrest 12 and a handle grip H, which largely protrude in the vehicle width direction, first contact with the ground, thereby protecting parts such as the fuel tank T with less amount of protrusion in the vehicle width direction. Specifically for an embodiment, the amount of protrusion of the second tank section 20 in the side stand 13 side may be reduced in the vehicle width direction, which may be advantageous also from the viewpoint of prevention of damage on the second tank section 20 when the vehicle contacts the ground.

The fuel tank T is separated into an upper part and a lower part by bottom edges of the first and the second groove sections 29, 36 as a mating face. The whole edge of the mating face is welded to provide a hollow construction. Thus, in an embodiment, a wall face constituting the clearance groove 18 and the mounting face 30 form an obtuse angle (angle a shown in FIG. 3) in the second tank section 20. Therefore, in comparison with the case that the mounting face 30 is formed horizontal (the wall face constituting the clearance groove 18 and the mounting face 30 form a generally right angle), the fuel tank T can be easily pressed.

Furthermore, the second protrusion 32 is formed to protrude downward in the lower end outer edge of the second tank section 20. Therefore, pipes such as the release pipe 34 and the return pipe 35, which protrude from the lower surface of the base plate 43, are not exposed to the side of the vehicle, thereby providing a good appearance. In addition, the mounting face 30 is formed in a down grade toward the outer edge. Therefore, it becomes relatively easy to shield a space below the mounting face 30 since the height of the second protrusion 32 below the mounting face 30 can be shortened for example.

Furthermore, in selecting the mounting space for the fuel pump 33, the front side of the mounting face 30 is selected for the purpose of taking advantage of the fact that the front side of the fuel tank T is shaped widely. Therefore, the mounting face 30 need not be partially enlarged in order to secure the mounting space.

Tilting the mounting face 30 allows the fuel pump 33 to be tilted with respect to a horizontal plane and allows the fuel in the second tank section 20 to be collected in the second groove section 36 side. In an embodiment, the suction port 47 of the fuel pump 33 is positioned at a lower end of a side opposing to the second groove section 36 (i.e., the suction port 47 is near the second groove section 36). Therefore, the residual quantity of fuel, which remains without being drawn by the fuel pump 33 when the remaining amount of fuel in the second tank section 20 reaches a low level, may be reduced.

The filler opening 26 for the fuel tank T is provided in the first tank section 19 which does not include the fuel pump 33. Therefore, when a nozzle of the gasoline pump is inserted into the filler opening 26, interference with the fuel pump 33 can be prevented.

In an embodiment, the fuel pump 33 is maintained in a tilted posture toward the outside in the vehicle width direction. Accordingly, in comparison with the case that the fuel pump 33 is maintained in an erect posture, lower ends of the pipes 34, 35 protruding from the base plate 43 are shifted inward in the vehicle width direction. Then, interference with the cylinder 15 in the front side would be concerned, however, in an embodiment, the cylinder 15 positioned in the front side is placed to be apart from the fuel pump with respect to the cylinder 16 positioned in the rear side in the vehicle width direction. Therefore, such concerns are alleviated.

It should be understood that the invention is not limited to the embodiments described above with respect to the descriptions and figures, and for example, the following embodiments are included in the technical scope of the invention. Furthermore, various changes may be made without departing from the scope of the invention besides the embodiments described below and herein.

As an example with respect to one or more of the embodiments described herein, the mounting face 30 is formed in a downward grade from the inner edge side to the outer edge side in the vehicle width direction. However, in contrast to these embodiment(s), the mounting face 30 may be formed in an upward grade from the inner edge side to the outer edge side in view of securing its width dimension, in accordance with one or more embodiments.

As another example with respect to one or more of the above embodiments described herein, a motorcycle with a V-type engine is shown and described. However, the engine type is not limited to a certain type and may be of various engine types in accordance with one or more embodiments.

In general, embodiments described above illustrate but do not limit the invention. It should also be understood that numerous modifications and variations are possible in accordance with the principles of the present invention. Accordingly, the scope of the invention is defined only by the following claims.

What is claimed is:

1. A motorcycle comprising:
a tank rail defining an upper portion of a body frame;
a fuel tank including a pair of tank sections disposed across the tank rail in a motorcycle width direction, a connecting section to provide fluid communication between the pair of tank sections across the tank rail, and a mounting surface; and
a fuel pump disposed in the fuel tank to supply fuel to an engine, the fuel pump being attached to the mounting surface; wherein
the mounting surface defines a bottom surface of one of the pair of tank sections and the mounting surface is inclined with respect to the motorcycle width direction.

2. The motorcycle according to claim 1, wherein the mounting surface is inclined downwardly from an inner side of the fuel tank to an outer side of the fuel tank in the motorcycle width direction.

3. The motorcycle according to claim 1, further comprising a protrusion arranged on an outer lower edge of the one of the pair of tank sections that is provided with the fuel pump, the protrusion extending downward from the outer lower edge.

4. The motorcycle according to claim 1, further comprising a side stand provided on one side of the body frame in the motorcycle width direction, and the fuel pump is located in the one of the pair of tank sections that is located on the one side of the body frame including the side stand.

5. The motorcycle according to claim 1, wherein a width dimension of the fuel tank in the motorcycle width direction increases toward a front of the fuel tank, and the fuel pump is positioned in the front of the fuel tank.

6. The motorcycle according to claim 1, wherein the fuel pump is mounted in the one of the pair of tank sections at an incline such that the fuel pump and the mounting surface define a generally right angle.

7. The motorcycle according to claim 1, wherein the fuel tank includes a filler opening to supply fuel into the fuel tank, the filler opening being provided on an upper surface of the one of the pair of tank sections that does not include the fuel pump.

8. The motorcycle according to claim 1, wherein the mounting surface includes a mounting opening and a flat sealing surface extending around a circumference of the mounting opening.

9. The motorcycle according to claim 8, further comprising a base plate to support the fuel pump, wherein a longitudinal end of the fuel pump is supported by the base plate and the base plate is mounted on the sealing surface.

10. The motorcycle according to claim 9, wherein the base plate is mounted on the sealing surface via a sealing member.

11. The motorcycle according to claim 6, wherein the fuel pump includes a fuel suction port opening downward with respect to an inclined direction of the mounting surface.

12. The motorcycle according to claim 1, further comprising an engine coupled to the tank rail, wherein the engine includes a front cylinder and a rear cylinder defining a generally V-shape in a fore-and-aft direction of the motorcycle, and the front cylinder is spaced from both the fuel pump and the rear cylinder in the motorcycle width direction.

13. A motorcycle comprising:
a tank rail defining an upper portion of a body frame of the motorcycle;
an engine disposed below and coupled to the tank rail;
a fuel tank including a right tank section and a left tank section disposed on opposite sides of the tank rail, a connecting section to fluidly connect the right tank section and the left tank section across the tank rail, and a mounting surface; and
a fuel pump disposed in the fuel tank to supply fuel to the engine, the fuel pump being attached to the mounting surface; wherein
the mounting surface is disposed on a bottom surface of the left tank section or the right tank section, and the mounting surface is angled downward and away from the tank rail.

14. The motorcycle according to claim 13, further comprising a side stand coupled to the body frame, the side stand being provided on a side of the motorcycle including the left tank section or the right tank section that include the fuel pump.

15. The motorcycle according to claim 13, wherein a plane disposed perpendicular to the mounting surface defines a positive angle with respect to a plane disposed vertically through the motorcycle.

16. The motorcycle according to claim 13, further comprising a protrusion disposed on an outer lower edge of the left tank section or the right tank section that is provided with the fuel pump, wherein the protrusion extends downward from the outer lower edge, and the fuel pump includes a fuel suction port directed towards the protrusion.

17. The motorcycle according to claim 13, wherein the fuel tank includes a filler opening to allow fuel into the fuel tank, wherein the filler opening is provided on an upper surface of the left tank section or the right tank section that is not provided with the fuel pump.

18. The motorcycle according to claim 13, further comprising a base plate to support the fuel pump, wherein a longitudinal end of the fuel pump is supported by the base plate and the base plate is mounted to the mounting surface via a sealing member.

19. The motorcycle according to claim 13, wherein the engine includes a front cylinder and a rear cylinder defining a generally V-shape in a fore-and-aft direction of the motorcycle, and the front cylinder is spaced from both the fuel pump and the rear cylinder in a motorcycle width direction.

* * * * *